Patented Apr. 10, 1951

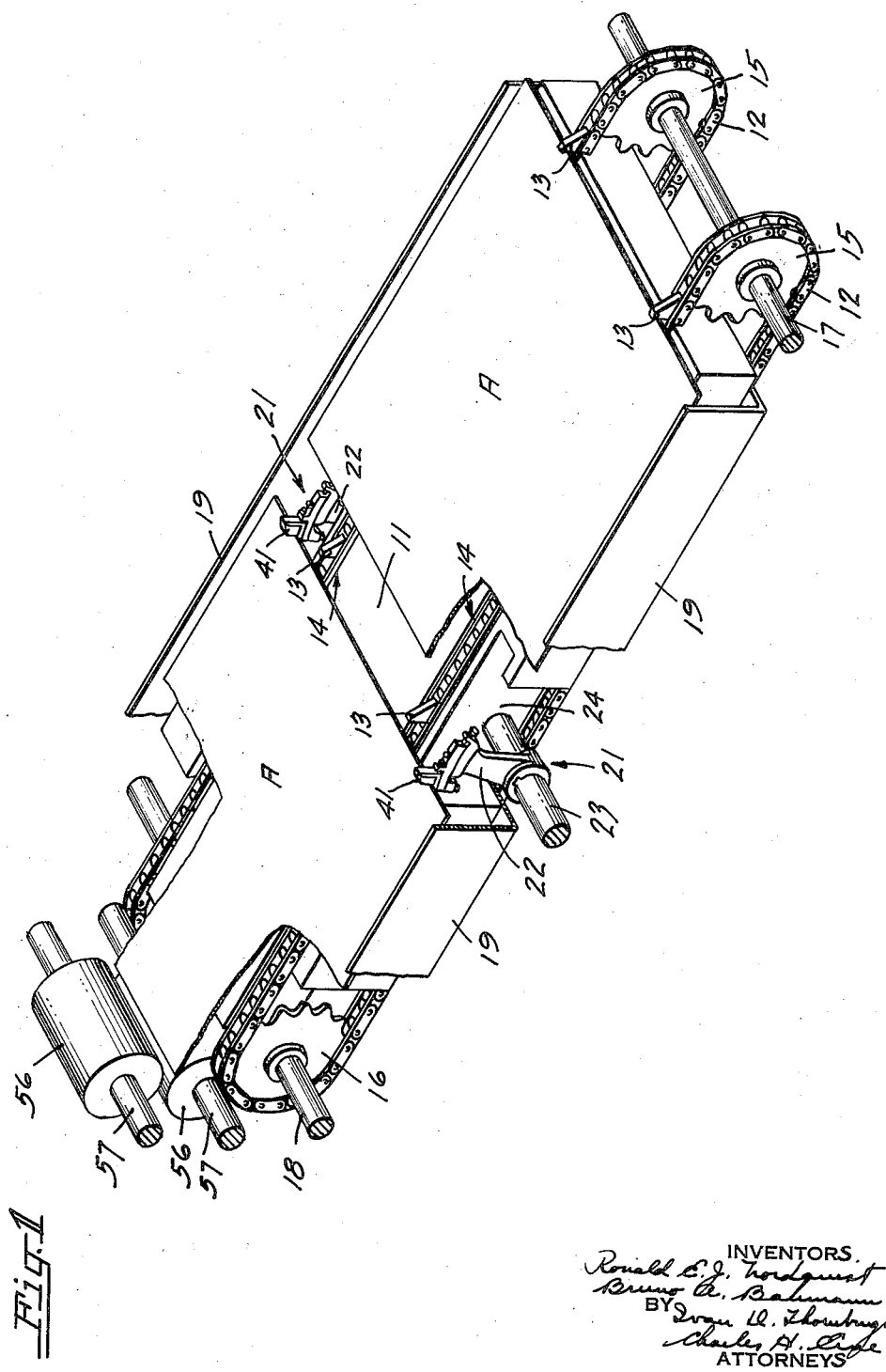

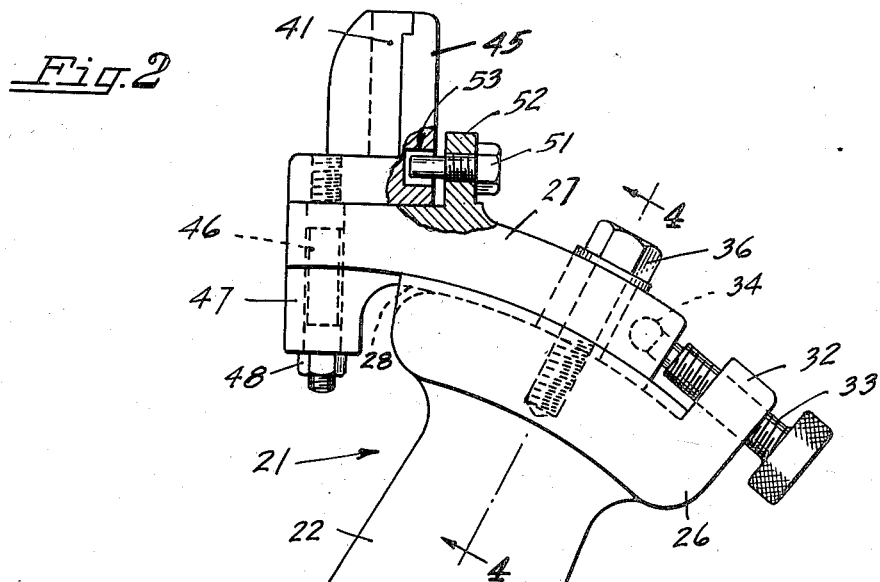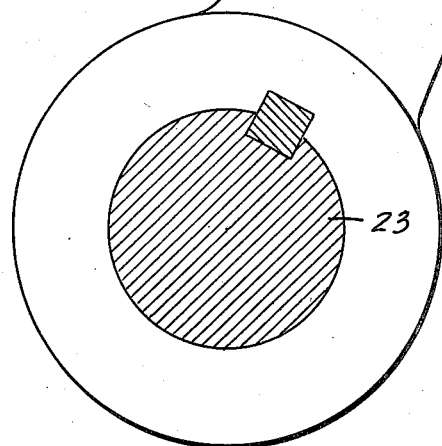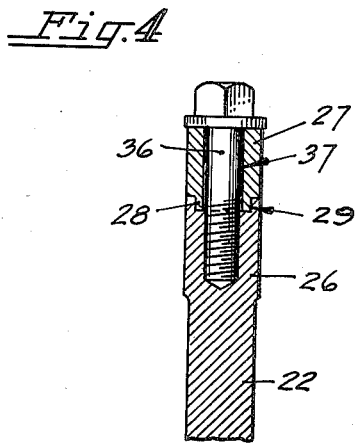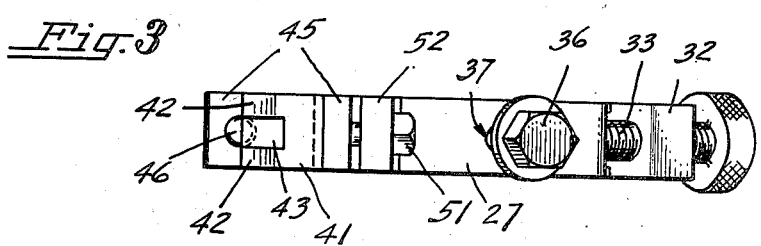

2,547,964

UNITED STATES PATENT OFFICE 2,547,964

SHEET GAUGING APPARATUS

Ronald E. J. Nordquist, Maplewood, and Bruno A. Baumann, Newark, N. J., assignors to American Can Company, New York, N. Y., a corporation of New Jersey Application September 23, 1946, Serial No. 698,782

9 Claims. (Cl. 271—50)

The present invention relates to sheet gauging apparatus for machines in which sheet material is required to be located in a predetermined position for further treatment and has particular reference to a movable gauge which is adjustable for gauging contact with an edge of the sheet material. The invention constitutes an improvement over the sheet gauging apparatus disclosed in applicants' earlier filed issued Patent No. 2,484,845, dated October 18, 1949.

An object of the invention is the provision of a rotary gauge device having a gauging element which is adjustable relative to the device for rapidly placing sheets of material into a predetermined gauged position as the sheets move in a procession along a path of travel.

Another object is the provision of such a gauge device wherein various gauges of a plurality of such gauges adapted to contact a sheet at more than one place along an edge thereof, may be quickly and accurately aligned for a predetermined gauging action against the sheet.

Another object is the provision of such a gauge device wherein the gauging element is magnetic for retaining the edge of a metallic sheet in engagement with the gauging element upon contact with the sheet edge, thereby holding the sheet under control and preventing jumping away from the gauge element upon contact.

Another object is the provision of such a gauge device wherein the gauge element is self-aligning with the edge of the sheet to be gauged for effecting rapid and accurate gauging of the sheet.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a sheet gauging apparatus embodying the instant invention, with parts broken away;

Fig. 2 is an enlarged side view of a gauge device used in the apparatus, with parts broken back and shown in section;

Fig. 3 is a top plan view of the device illustrated in Fig. 2; and

Fig. 4 is a sectional view taken substantially along the line 4—4 in Fig. 2 with parts broken away.

As a preferred embodiment of the invention the drawings illustrate principal parts of a feeding mechanism including back gauge devices for gauging or squaring the back edges of sheets A of tin plate or the like sheet material and for advancing the gauged sheets into a sheet treating machine such as a printing apparatus, scroll shear, slitter or other machine used for preparing or converting the sheets into container or can parts. However, the invention is equally well adapted to gauging the sheets along their side edges also if such gauging is desirable.

In the apparatus the sheets A are advanced continuously along a straight line path of travel across a feed table 11 (Fig. 1) by a pair of spaced and parallel endless chain conveyors 12 having feed dogs 13 secured thereto at spaced intervals along their lengths for engaging the back or rear transverse edges of the sheets. These chains travel through longitudinal grooves 14 formed in the top of the table. The chains operate over and are driven by pairs of spaced sprockets 15, 16 which are mounted on continuously rotating shafts 17, 18 disposed at the feed-in and the discharge ends respectively of the table. The shafts are rotated in any suitable manner.

The conveyors 12 are utilized to feed a sheet A to a place or station immediately adjacent the subsequent operation machine and at this station and while the sheet is continuously moving forward, it is gauged for proper location and alignment and is immediately advanced into the subsequent operation machine while so gauged. In gauging the sheet it is shifted away and clear of the conveyor feed dogs 13 and is brought into a squared-up position relative to the rear or feeding edge of the sheet before advancing into the subsequent operation machine. Suitable side guides 19 secured to the table 11 guide the sheet longitudinally of the machine. If desired these side guides may be made movable to travel with the sheets in any well known manner.

With the instant gauging devices this squaring of the sheet is effected rapidly, almost momentarily, and while the sheet is traveling forward over a short distance. These devices thus are well adapted to high speed feeding operations.

Squaring of the sheets A along their rear or feeding edges is brought about by a pair of squaring-up or back gauges 21 (Figs. 1 and 2) disposed in the path of travel of the sheets. Each back gauge includes a gauge arm 22 constituting a movable member, and two such gauge arms, one for each gauge, are mounted in spaced relation adjacent the conveyor chains 12, on a continuously rotating cross shaft 23. The shaft is journaled in bearings 24 formed in the table 11. This gauge shaft is rotated in any suitable manner in time with the conveyors 12 and this rotates the arms 22 through circular paths of travel concentric with the shaft.

The outer or free end of each of the gauge arms 22 is formed with a segment head 26 which carries a movable curved block 27. The bottom of the block is formed with a longitudinal tongue 28 (see Fig. 4) which is slidable in a curved groove 29 formed in the top of the head 26. The block may be moved relative to the gauge arm 22 along a curved path of travel concentric with the gauge shaft 23.

Movement of the gauge block 27 relative to the gauge arm 26 is brought about manually. For this purpose the gauge arm head 26 is formed with a lug 32 which carries an adjusting screw 33. The inner end of this screw is formed with a ball 34 which is engaged in a universal joint socket provided in the back end of the block 27. After an adjustment of the block 27 it may be locked in its new position by a locking bolt 36. This bolt extends through a clearance slot 37 (see also Fig. 3) in the block and is threadedly engaged in the gauge arm head 26.

The forward end of the gauge block 27 carries a magnetic, self-aligning gauge finger 41 for engagement against the back edge of a sheet A to be squared up. The sheet contacting face of this finger preferably is curved radially to facilitate proper engagement with the sheet edge. This finger is preferably a permanent magnet having spaced pole pieces 42 (see Fig. 3) and a spacer 43, the latter preferably made of brass, disposed between the pole pieces for providing a continuous sheet contacting surface.

The magnetic finger 41 is secured to a swivel element 45 which is mounted on the gauge block 27. The swivel element is secured to the upper end of a swivel pin 46 which is freely carried in a bore formed in the forward end of the gauge block and in a boss 47 depending from the block. A lock nut 48 carried on the lower end of the pin retains it against displacement.

Movement of the swivel element 45 relative to the gauge block 27 is limited by a stop screw 51 (Figs. 2 and 3). This screw is secured in a rim 52 which extends up from and across the gauge block 27 and which is disposed adjacent the back of the swivel element. The inner end of the screw extends into a clearance recess 53 formed in the back of the swivel element, the screw being in spaced relation to the sides of the recess for limiting the turning action of the swivel element when the element is out of contact with a sheet being gauged.

Hence as a pair of feed dogs 13 of the conveyors 12 moves adjacent the squaring-up or gauge devices 21, while advancing a sheet A across the table 11, the magnetic, self-aligning gauge fingers 41 travel up behind the moving sheet and engage against its rear edge, the two fingers serving as contact or squaring points. As the fingers come into contact with the sheet edge they rotate or shift slightly with their swivel pins 46 and thus align themselves individually with the sheet edge so that the contacting face of each finger will engage the sheet edge evenly or squarely. This is the self-aligning feature of the fingers.

Upon contact of the gauge fingers 41 with the edge of a sheet A, the magnetic properties of the fingers attract the sheet to them and hold it against displacement therefrom during the gauging action. The sheet thus is prevented from bouncing off or otherwise moving away from the fingers upon initial contact.

This engagement of the fingers with the sheet shifts it forwardly away from and in advance of the moving feed dogs 13 so that the sheet is engaged only by the gauge fingers. It is this action effective against the back edge of the sheet that shifts it into a squared position, the fingers being set prior to operation of the apparatus, in a desired position through manipulation of the adjusting screws 33, hereinbefore described. Through these adjusting screws the gauge blocks 27, and hence the gauge finger, of each of the gauge devices may be accurately and rapidly shifted relative to its corresponding gauge arm 22 into a predetermined position which will result in a squaring up of the back edge of the sheet prior to its advancement into the subsequent operation machine.

With the squared-up sheet in this slightly advanced position relative to the feed dogs 13, it is carried forward by the gauge fingers 41 into the feed-in section of the subsequent operation machine. A pair of continuously rotating feed rollers 56 mounted on cross shafts 57 disposed adjacent the discharge end of the gauging apparatus is shown by way of example for receiving the gauged sheets and for feeding them into the subsequent operation machine. As the feed rollers grip a ganged sheet and feed it into the machine, the gauge fingers 41 travel down behind the sheet, through an arcuate path of travel and come up on the other side behind the next following sheet to repeat their gauging operation upon this sheet. This completes the cycle of operation of the gauging devices.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A back gauge for a sheet gauging apparatus, comprising a member continuously rotatable in one direction on a fixed axis, a gauge finger mounted on said member for engaging the back edge of a moving sheet for shifting the sheet into a gauged position, and means on said rotatable member for bodily moving said finger relative to said member for adjustably locating the finger in a predetermined gauging position.

2. A back gauge for a sheet gauging apparatus, comprising a movable member, a block carried on said member and movable bodily relative thereto, a self aligning gauge finger pivotally mounted on said block for engaging the back edge of a moving sheet for shifting the sheet into a gauged position, means on said member for bodily sliding said block on said member for adjustably locating said finger in a predetermined gauging position, and means for locking said block in its adjusted position on said movable member.

3. A back gauge for a sheet gauging apparatus, comprising an axially fixed shaft, a member continuously rotatable in one direction on said shaft and having a curved face concentric with the axis of the shaft, a block mounted on the curved face of said rotatable member, and a self aligning gauge finger pivotally mounted on said block for aligning with and engaging the back edge of a sheet moving along a predetermined path of travel for shifting the sheet into a gauged position, said gauge finger being pivotally mounted on said block to swing on an axis disposed radically of said axially fixed shaft.

4. A back gauge for a sheet gauging apparatus, comprising a rotatable gauge arm having a segment head, a block carried by said gauge arm segment head, a magnetic self-aligning gauge finger pivotally mounted on said block for aligning with and engaging the back edge of a sheet moving along a predetermined path of travel for shifting the sheet into a gauged position, said gauge finger being pivotally mounted on said block to swing on an axis disposed radially of the axis of rotation of said gauge arm, and a stop element mounted on said block adjacent said gauge finger for limiting the pivotal movement of the finger.

5. A back gauge for a sheet gauging apparatus, comprising an arm continuously rotatable in one direction upon a fixed axis and having a segment head, a curved movable block carried on the outer face of said segment head in a sliding tongue and groove connection, a self-aligning gauge finger pivotally mounted on said block for aligning with and engaging the back edge of a moving sheet for accelerating the sheet travel for shifting the sheet into a gauged position, said self-aligning gauge finger being pivotally mounted on said block to swing on an axis disposed radially of the fixed axis of rotation of said continuously rotatable arm, a stop element on said block for engaging said finger and for limiting the pivotal movement of said finger, means on said arm for moving said block along its tongue and groove connections to locate the finger in a predetermined gauging position, and means for locking said block in its adjusted position.

6. In a sheet gauging apparatus, the combination of feeding means for advancing sheets along a predetermined path of travel, a member rotatable on a fixed axis located adjacent said feeding means, a self aligning gauge finger movably mounted on said rotatable member for engaging the rear edge of a sheet being advanced by said feeding means, said self aligning gauge finger being pivotally mounted on said rotatable member on an axis disposed radially of the fixed axis of the latter, means for rotating said rotatable member at a faster rate of travel than said feeding means to shift said advancing sheet forwardly relative to said feeding means to gauge the sheet, and advancing means for receiving and for further advancing the gauged sheet.

7. In a sheet gauging apparatus, the combination of a conveyor for advancing sheets along a predetermined path of travel, a member continuously rotatable in one direction on a fixed axis located adjacent said conveyor, a self aligning magnetic gauge finger movably mounted on said rotatable member for engaging and yieldably holding against relative movement the rear edge of a sheet being advanced by said conveyor, means for moving said rotatable member in the rear of said advancing sheet at a faster rate of travel than the travel of said conveyor to engage the rear edge of and shift said sheet ahead of its position on said conveyor to gauge the sheet, means for bodily moving said finger into a predetermined gauging position on said rotatable member, and advancing means for receiving and for further advancing the gauged sheet.

8. In a sheet gauging apparatus, the combination of feeding means for advancing sheets along a predetermined path of travel, a pair of spaced rotatable members located adjacent said feeding means and continuously rotatable in one direction on a fixed axis, a self aligning gauge finger pivotally mounted on each of said members on an axis disposed radially of the axis of rotation of a said member for engaging the rear edge of a sheet being advanced by said feeding means, means for rotating said members towards the rear edge of said advancing sheet at a faster rate of travel than said feeding means to square up the sheet against the fingers and to shift the sheet ahead of said feeding means to locate the sheet in gauged position, and advancing means for receiving the gauged sheet and for further advancing it so gauged.

9. In a sheet gauging apparatus, the combination of a pair of spaced conveyors, means for moving said conveyors at a predetermined rate, feed dogs carried by said conveyors for engaging and for advancing sheets along a predetermined path of travel, a pair of rotatable gauge arms mounted on fixed axes adjacent said conveyors, a gauge finger movably mounted on each gauge arm for engaging the back edge of a sheet being advanced by said conveyors, means for rotating said gauge arms continuously in a forward direction at a faster rate of travel than that of said conveyors to dispose said gauge fingers in proper position relative to the advancing sheet and to shift the sheet when engaged by said fingers into gauged position and forwardly away from said feed dogs, and advancing means for receiving the gauged sheet and for further advancing it while maintaining the sheet in gauged position.

RONALD E. J. NORDQUIST.
BRUNO A. BAUMANN.

REFERENCES CITED

The following references are of record in the file of this patent:

UNITED STATES PATENTS

| Number | Name | Date |
|---|---|---|
| 415,132 | Wendte | Nov. 12, 1889 |
| 1,029,159 | Westerbeck | June 11, 1912 |
| 1,340,595 | Biggert | May 18, 1920 |
| 1,362,100 | Henderson | Dec. 14, 1920 |
| 1,487,811 | Savage | Mar. 25, 1924 |
| 1,494,174 | Lane | May 13, 1924 |
| 1,587,855 | Redding | June 8, 1926 |
| 1,870,339 | Lincoln | Aug. 9, 1932 |
| 2,200,409 | Backhouse | May 14, 1940 |
| 2,342,571 | Carroll | Feb. 22, 1944 |
| 2,484,845 | Nordquist et al. | Oct. 18, 1949 |